(12) United States Patent
Ladani et al.

(10) Patent No.: US 8,096,191 B2
(45) Date of Patent: Jan. 17, 2012

(54) MECHANICAL TEST FIXTURE WITH SUBMICRON TOLERANCE

(75) Inventors: Leila J Ladani, Logan, UT (US); Jafar Razmi, Logan, UT (US); Jason M Carter, Logan, UT (US)

(73) Assignee: Utah State University, North Logan, UT (US)

( * ) Notice: Subject to any disclaimer, the term of this patent is extended or adjusted under 35 U.S.C. 154(b) by 261 days.

(21) Appl. No.: 12/611,189

(22) Filed: Nov. 3, 2009

(65) Prior Publication Data

US 2011/0100133 A1    May 5, 2011

Related U.S. Application Data

(60) Provisional application No. 61/110,636, filed on Nov. 3, 2008.

(51) Int. Cl.
    *G01L 1/00*     (2006.01)
    *G01N 3/08*     (2006.01)
    *G01N 3/02*     (2006.01)

(52) U.S. Cl. ............... 73/856; 73/780; 73/826; 73/831

(58) Field of Classification Search ............... 73/780, 73/865.3, 855–860, 818, 826, 831–833, 853
See application file for complete search history.

(56) References Cited

U.S. PATENT DOCUMENTS

| | | | | |
|---|---|---|---|---|
| 4,633,249 A | * | 12/1986 | Sasaki | ............ 324/725 |
| 5,377,549 A | * | 1/1995 | Werner | ............ 73/860 |
| 5,425,276 A | * | 6/1995 | Gram et al. | ............ 73/816 |
| 5,945,607 A | * | 8/1999 | Peppel et al. | ............ 73/856 |
| 5,948,994 A | * | 9/1999 | Jen et al. | ............ 73/856 |
| 6,389,876 B1 | * | 5/2002 | Tanimura et al. | ............ 73/12.01 |
| 6,526,837 B1 | * | 3/2003 | Grote et al. | ............ 73/856 |
| 7,404,334 B2 | * | 7/2008 | Saari et al. | ............ 73/856 |
| 7,513,168 B2 | * | 4/2009 | Alba | ............ 73/826 |
| 7,552,650 B2 | * | 6/2009 | Phelan et al. | ............ 73/856 |
| 7,568,397 B2 | * | 8/2009 | Merendino, Sr. | ............ 73/856 |

OTHER PUBLICATIONS

Lion Precision. "Capacitive Sensor Operation and Optimzation (How Capacitve Sensors Work and How to USe Them Effectively)" Available Dec. 19, 2005 <http://www.lionprecision.com/tech-library/technotes/cap-0020-sensor-theory.html>.*

* cited by examiner

*Primary Examiner* — Lisa Caputo
*Assistant Examiner* — Jonathan Dunlap

(57) ABSTRACT

The mechanical test apparatus is a fixture utilizing capacitive gauge sensors, located in close proximity to a test specimen, to measure strain in miniature specimens. The upper collar is connected to the upper bolt which is connected to the cross head of the mechanical test machine and the lower collar is attached to the lower bolt which is attached to the load cell. The collars contain conductive target plates and capacitive gauge sensors oriented to form the two plate electrodes of a capacitor. These plates are precisely positioned and move as a mechanical test is performed. The measured voltage is proportional to the distance between the plates, thus allowing the strain to be calculated. The system can be configured to perform tensile, compression, and bending tests at submicron tolerances.

21 Claims, 6 Drawing Sheets

MECHANICAL TEST FIXTURE WITH SUBMICRON TOLERANCE

FIELD OF THE INVENTION

This invention relates to a mechanical test fixture and in particular to a system that can be configured for tensile, compression, and bending tests with submicron tolerances for measuring displacement in small specimens.

BACKGROUND OF THE INVENTION

The measurement of mechanical properties using specimens whose minimum dimensions are on the order of micrometers is an important new area of experimental solid mechanics. One obvious application is in the area of microelectromechanical systems (MEMS) where the final product is on the millimeter or micrometer size scale. Efforts to characterize the small scale mechanical properties of materials result from the desire to accurately and reliably model the performance of MEMS and other small scale devices.

The desire to measure properties such as the modulus of elasticity, yield strength, ultimate tensile strength, failure strength, and elongation at failure is critical for designing, modeling behavior, and predicting the performance of components.

Testing materials at the microscale is very different from familiar macro property mechanical characterization tests. Miniaturizing the specimens creates many challenges in testing them, such as specimen preparation and gripping, applying forces, measuring displacements or strains, and eliminating the test structure and machine's deformation and displacements. In a specimen as small as 200 microns, 1 micron deformation indicates 0.05 strain. Therefore measuring displacement at the submicron level is critical in tests at these small scales. A few techniques have been developed to measure the strain and displacement in small specimens, such a capacitive gauges, eddy current sensors, and laser micrometer systems. These accurate sensors can be mounted on the test machine to measure displacements. The place the sensor is mounted is very important in obtaining accurate test results. The errors that may be introduced in measurements are due to test fixture deformation, cross head deformation, load cell deformation and tolerances of the test fixture. For instance, a few microns deformation in the load cell will result in a completely inaccurate capacitive gauge measurement, thus making the position of the capacitive gauge critical.

The properties of thin films and materials with micron size dimensions are not necessarily the same as their bulk counterparts, thus there is a clear need for accurate miniaturized mechanical test fixtures and measurement devices.

SUMMARY OF THE INVENTION

In view of the foregoing, in accordance with the invention as embodied and broadly described herein, an apparatus is disclosed in one embodiment of the present invention as a mechanical test fixture that utilizes a capacitive gauge located immediately adjacent to the gauge section of the specimen for accurate strain measurement. To eliminate displacements caused by deformation and tolerance of the test fixture, load cell and cross head, the capacitive gauge sensor is mounted in very close proximity to the specimen gauge length to monitor only the change in specimen length inside the gauge length. The apparatus consists of a lower collar in which one or more capacitive gauges are mounted and an upper collar containing the corresponding one or more adjustable target plates. The adjustable target plate is conductive in order to create a capacitor with the sensor head. To record accurate data, the capacitive gauge sensor is located a certain distance from the moving object, which is the gauge length of the test specimen. The height of the sensor is adjusted using an adjustment mechanism such as a screw or other appropriate device. In addition, a screw or other appropriate adjustment mechanism is used to position the target plate in the upper collar within the detectable range of the capacitive gauge sensor.

The fixture is designed to accommodate small scale tensile, compression, shear, and both 4-point bending and 3-point bending test specimens. To convert the fixture from tensile and compression testing to the bending configuration two moving rollers are added to the top and bottom part of the fixture. The rollers can be moved on sliding rails to set the span for 3-point and 4-point bend tests to the desired length thus making it possible to use the fixture for a variety of tests including symmetric and asymmetric 4-point bending. The positions of the rollers are secured in place using screws or any other fastening mechanism.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF SELECTED EMBODIMENTS

Figure 1:
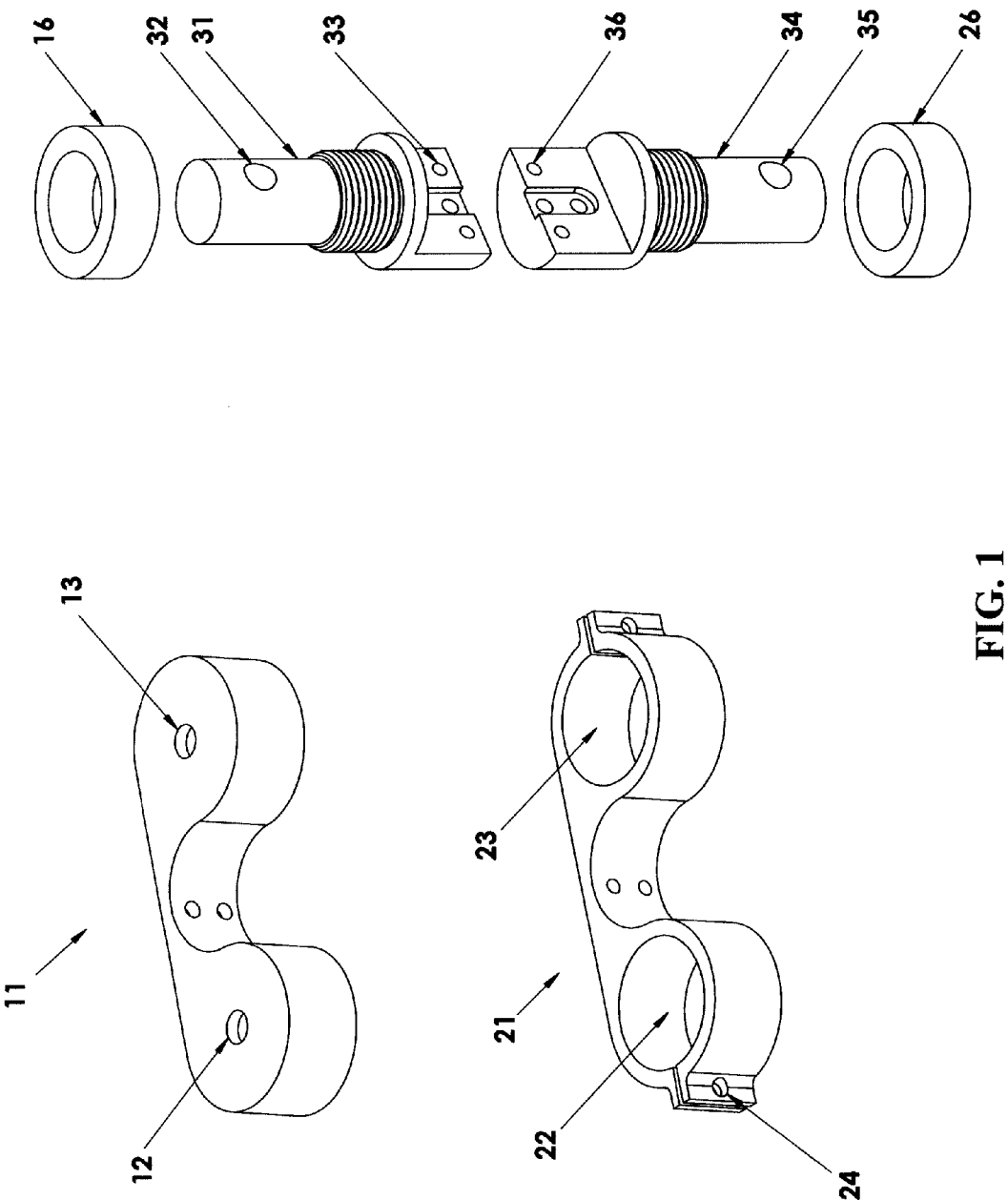
FIG. 1 illustrates the configuration of the collar and bolt for the tension compression embodiment.

In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as represented in the drawings, is not intended to limit the scope of the invention, but is merely representative of the various embodiments of the invention.

Disclosed are embodiments of a mechanical test apparatus that utilizes a capacitive gauge sensor to measure strain in micro scale specimens. The capacitive gauge sensor system, based on parallel plate capacitor technology, is used to measure distance, thickness, movement, displacement, and the like. The sensor and the target form the two plate electrodes of a capacitor. When a constant current flows through the sensor capacitor, a signal, which is the amplitude of the voltage at the sensor, is detected. This signal is proportional to the distance between the capacitor electrodes.

The apparatus is designed to position the capacitive gauge sensor as close to the test specimen as possible. This is accomplished by machining a test fixture using precision engineering concepts to maintain tolerances at submicron levels. The capacitive gauge sensors are mounted to a collar which is attached directly to the fixture in the immediate vicinity of the specimen, thus detecting the actual strain in the sample absent of any contribution from the test equipment. This location for mounting the sensor is critical for obtaining accurate results.

Referring to FIG. 1, the test apparatus consists of a first collar 11 and a second collar 21. The first collar 11 contains a first recessed housing 12 and a second recessed housing 13. The second collar 21 contains a first through housing 22 and a second through housing 23. For tension, compression, and shear tests, the first collar 11 is fastened to upper bolt 31 and the second collar 21 is fastened to lower bolt 34. For tension, compression, and shear tests, the test specimen (not shown) is fastened between the upper bolt 31 at fastening position 33 and the lower bolt 34 at fastening position 36.

Figure 2:
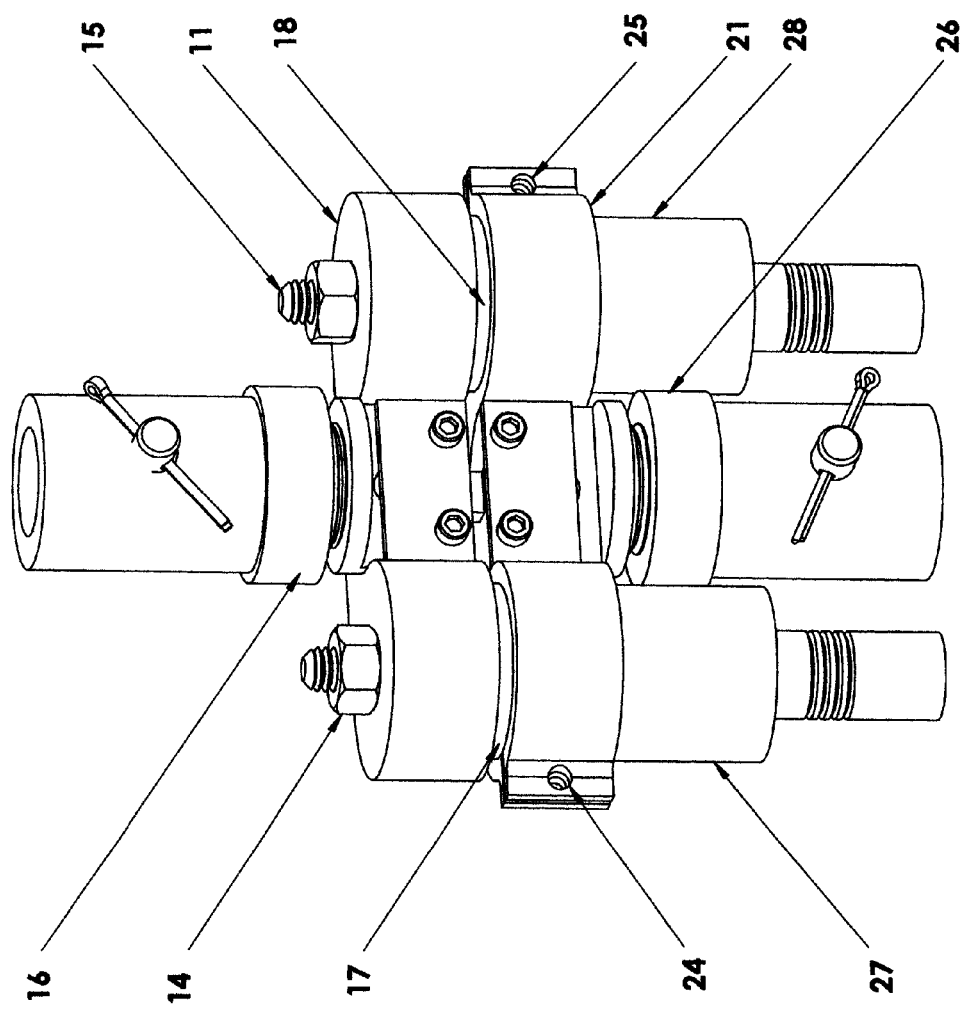
FIG. 2 illustrates the tension compression test configuration with two capacitive gauge sensors.

The test set up for tension, compression, and shear tests is shown in FIG. 2. A first conducting target plate 17 is mounted in the first recessed housing and a second conducting target plate 18 is mounted in the second recessed housing in the first collar 11. A first capacitive gauge sensor 27 is mounted in the first through housing and a second capacitive gauge sensor 28 is mounted in the second through housing in the second collar 21. The first collar 11 is fastened to the upper bolt which is fastened to the cross head of the test machine with the first ring 16 and the second collar 21 is fastened to the lower bolt which is fastened to the load cell of the test machine with the second ring 26. The rings 16, 26 apply pressure on the interface structure to maintain system alignment. The vertical position of the first capacitive gauge sensor 27 is secured with the first sensor adjusting mechanism 24, such as a screw or other appropriate device, and the vertical position of the second capacitive gauge sensor 28 is secured with a second sensor adjusting mechanism 25, such as a screw or other appropriate device. The first collar 11 is oriented such that the conductive target plates 17, 18 are aligned over the capacitive gauge sensors 27, 28 in the second collar 21. The target surfaces of the conductive target plates 17, 18 are parallel to the surfaces of the capacitive gauge sensors 27, 28. The distance between the target surface of the first conductive target plate 17 and the surface of the first capacitive gauge sensor 27 is adjusted by the first target plate adjusting mechanism 14, such as a bolt or other appropriate device. The distance between the target surface of the second conductive target plate 18 and the surface of the second capacitive gauge sensor 28 is adjusted by the second target plate adjusting mechanism 15, such as a bolt or other appropriate device. The distance is set such that the measured signal is within the range of the capacitive gauge sensor. When two or more capacitive gauge sensors are used the strain can be averaged to increase the accuracy of the measurement.

FIG. 2 is also representative of a losipescu specimen mounted in the fixture. This configuration produces an in-plane composite shear test utilizing a notched beam type sample which is loaded so as to produce a zero bending moment across the notch or test section. The specimen is mounted on the fixture by a plate screwed to the fixture. The capacitive gauge sensor is mounted such that the head of the capacitive gauge sensor is within the gauge length of the specimen and within a detectable distance from the adjustable plate. As the tension or compression forces are applied, the gauge length changes and the upper collar moves with respect to the lower collar. The capacitive gauge sensor detects this change in distance.

The first and second collars can be modified to contain more than two housings. These multiple housings are positioned such that when the collar is attached to the bolt, the housings are radially distributed around the axis of the test machine and introduce no net bending moment. This symmetrical design is to maintain balance, eliminate torque, and keep the fixture aligned. Multiple capacitive gauge sensors can be used with different detection ranges to provide course and fine measurements.

Figure 3:
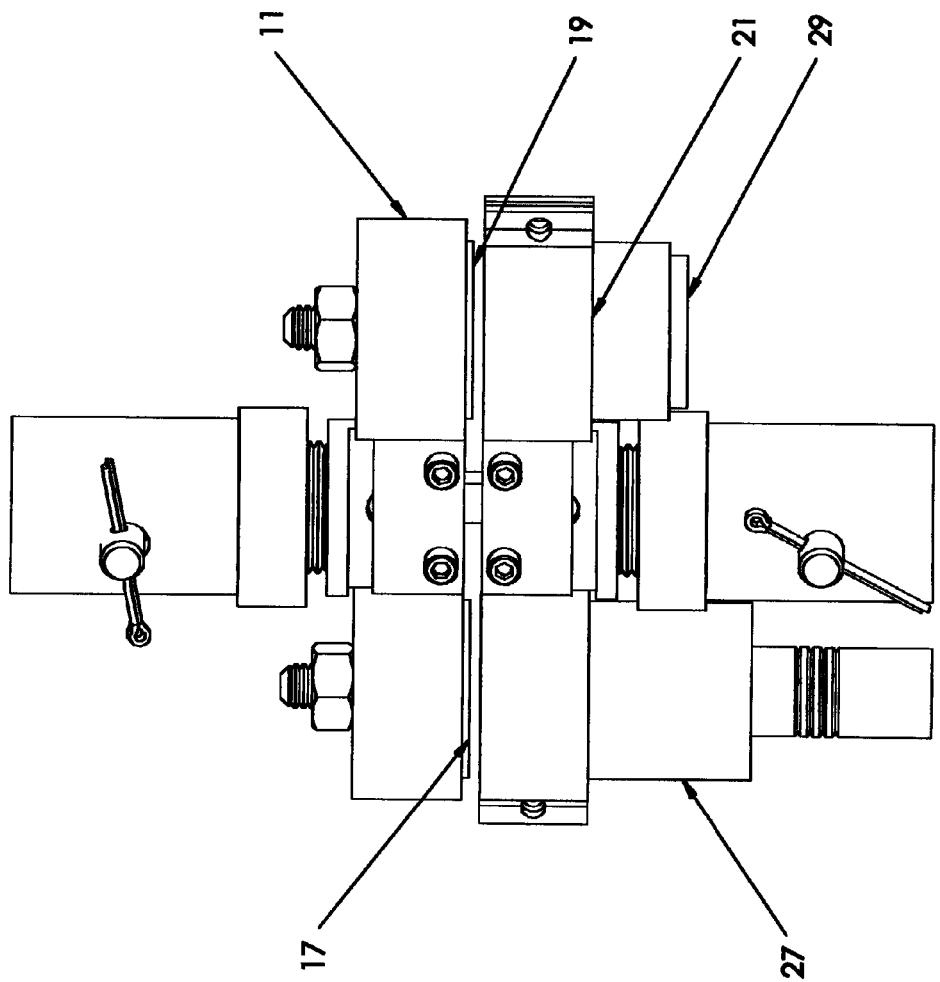
FIG. 3 illustrates the tension compression test configuration with one capacitive gauge sensor and one set of counterweights.

FIG. 3 shows the test set up for tension, compression, and shear tests in which only one capacitive gauge sensor is used. In this embodiment a first conducting target plate 17 is mounted in the first recessed housing and a target plate counterweight 19 is mounted in the second recessed housing in the first collar 11. A first capacitive gauge sensor 27 is mounted in the first through housing and a capacitive gauge counterweight 29 is mounted in the second through housing in the second collar 21. The counterweight is the same mass as the capacitive gauge to eliminate torque and keep the fixture aligned.

Figure 4:
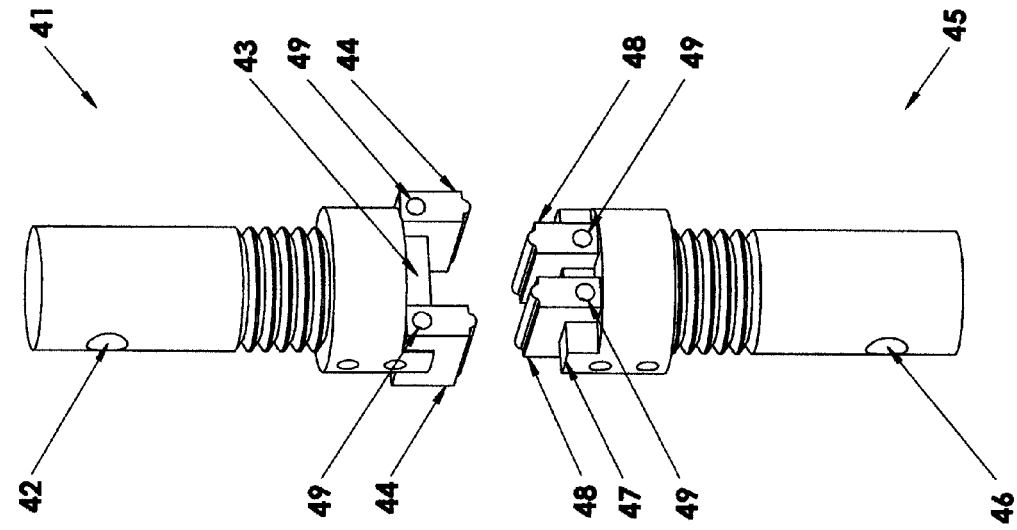
FIG. 4 illustrates the configuration of the collar and bolt for the bending embodiment.
Figure 4:
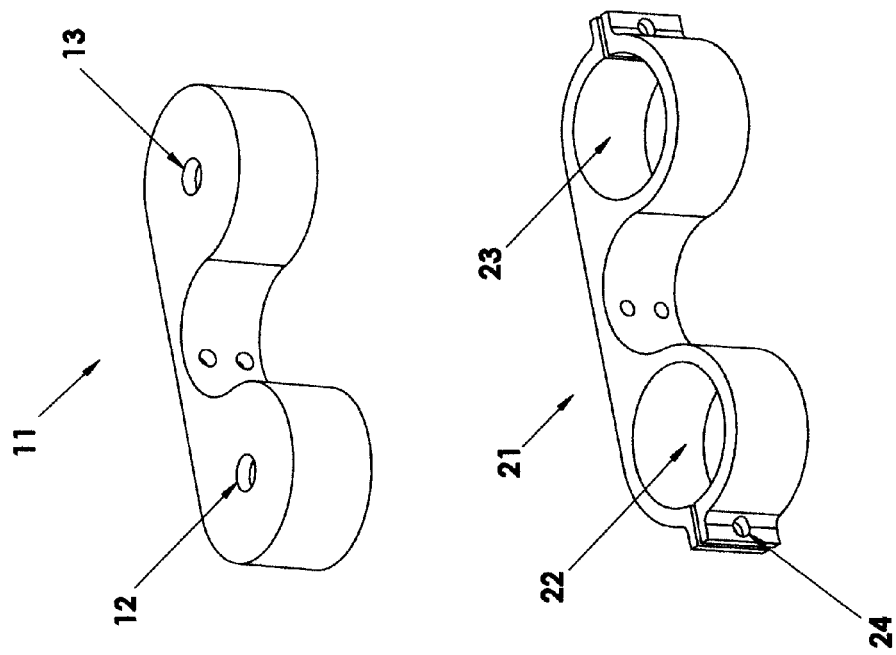

FIG. 4 shows the test apparatus for the bending embodiment. The test apparatus consists of a first collar 11 and a second collar 21. The first collar 11 contains a first recessed housing 12 and a second recessed housing 13. The second collar 21 contains a first through housing 22 and a second through housing 23. For bending tests, the first collar 11 is fastened to upper bolt 41 and the second collar 21 is fastened to lower bolt 45. For bending, the test specimen (not shown) is placed on the lower bolt specimen supports 48. The support span for the test is adjusted by moving the lower bolt specimen supports 48 along the lower bolt positioning slide 47 to the desired positions and securing them in place by tightening the specimen support positioning mechanisms 49, such as screws or other appropriate devices. One upper bolt specimen support 44 is used for 3-point bending tests and two upper bolt specimen supports 44 are used for 4-point bending tests. The span is adjusted by moving the upper bolt specimen supports 44 along the upper bolt positioning slide 43 to the desired positions and securing them in place by tightening the specimen support positioning mechanisms 49 such as screws or other appropriate devices. Only one upper bolt specimen support 44 is used for 3-point bending and the ability to adjust the positions of the specimen supports allows for asymmetrical tests to be performed.

Figure 5:
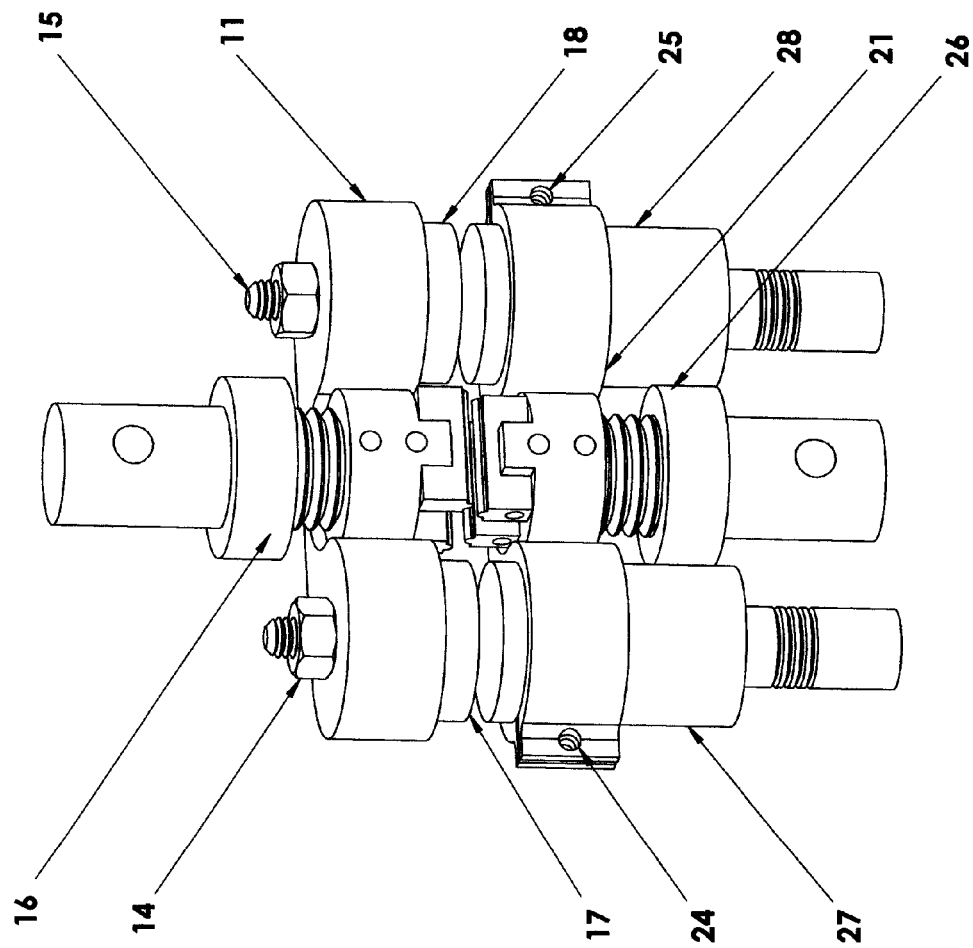
FIG. 5 illustrates the bending test configuration with two capacitive gauge sensors.

The test set up for 4-point bending tests is shown in FIG. 5. A first conducting target plate 17 is mounted in the first recessed housing and a second conducting target plate 18 is mounted in the second recessed housing in the first collar 11. A first capacitive gauge sensor 27 is mounted in the first through housing and a second capacitive gauge sensor 28 is mounted in the second through housing in the second collar 21. The upper bolt 41 is fastened to the cross head of the test machine with ring 16 and the lower bolt 45 is fastened to the load cell of the test machine with ring 26. The rings 16, 26 apply pressure on the interface structure to maintain system alignment. The vertical position of the first capacitive gauge sensor 27 is secured with the first sensor adjusting mechanism 24 and the vertical position of the second capacitive gauge sensor 28 is secured with the second sensor adjusting mechanism 25. The first collar 11 is oriented such that the conductive target plates 17, 18 are aligned over the capacitive gauge sensors 27, 28 in the second collar 21. The target surfaces of the conductive target plates 17, 18 are parallel to the surfaces of the capacitive gauge sensors 27, 28. The distance between the target surface of the first conductive target plate 17 and the surface of the first capacitive gauge sensor 27 is adjusted by the first target plate adjusting mechanism 14. The distance between the target surface of the second conductive target plate 18 and the surface of the second capacitive gauge sensor 28 is adjusted by the second target plate adjusting mechanism 15. The distance is set such that the measured signal is within the range of the capacitive gauge sensor. When two or more capacitive gauge sensors are used the strain can be averaged to increase the accuracy of the measurement. The apparatus can be set up for bending tests with one, two, or multiple capacitive gauge sensors using counterweights to keep the system balanced.

The test set up can be configured in many ways using one or more capacitive gauge sensors and counterweights. For example, FIG. 2 shows the first collar 11, which holds the target plates 17, 18 is fastened to the upper bolt 31 which is fastened to the cross head of the test machine and the second collar 21, which holds the capacitive gauge sensors 27, 28 is fastened to the lower bolt 34 which is fastened to the load cell of the test machine. The system can be configured such that the first collar, containing the conductive target plates, is attached to the lower bolt and the second collar, containing the capacitive gauge sensors is attached to the upper bolt. In this orientation the target surfaces of the target plates face up and the capacitive gauge sensors face down. If only one capacitive gauge sensor is used in this configuration, the capacitive gauge counterweight and the target plate counterweight are secured in their respective positions in the collars. The test set up can also be configured with both target plates and capacitive gauge sensors in the collar fastened to the upper bolt and corresponding capacitive gauge sensors and target plates in the collar fastened to the lower bolt.

Figure 6:
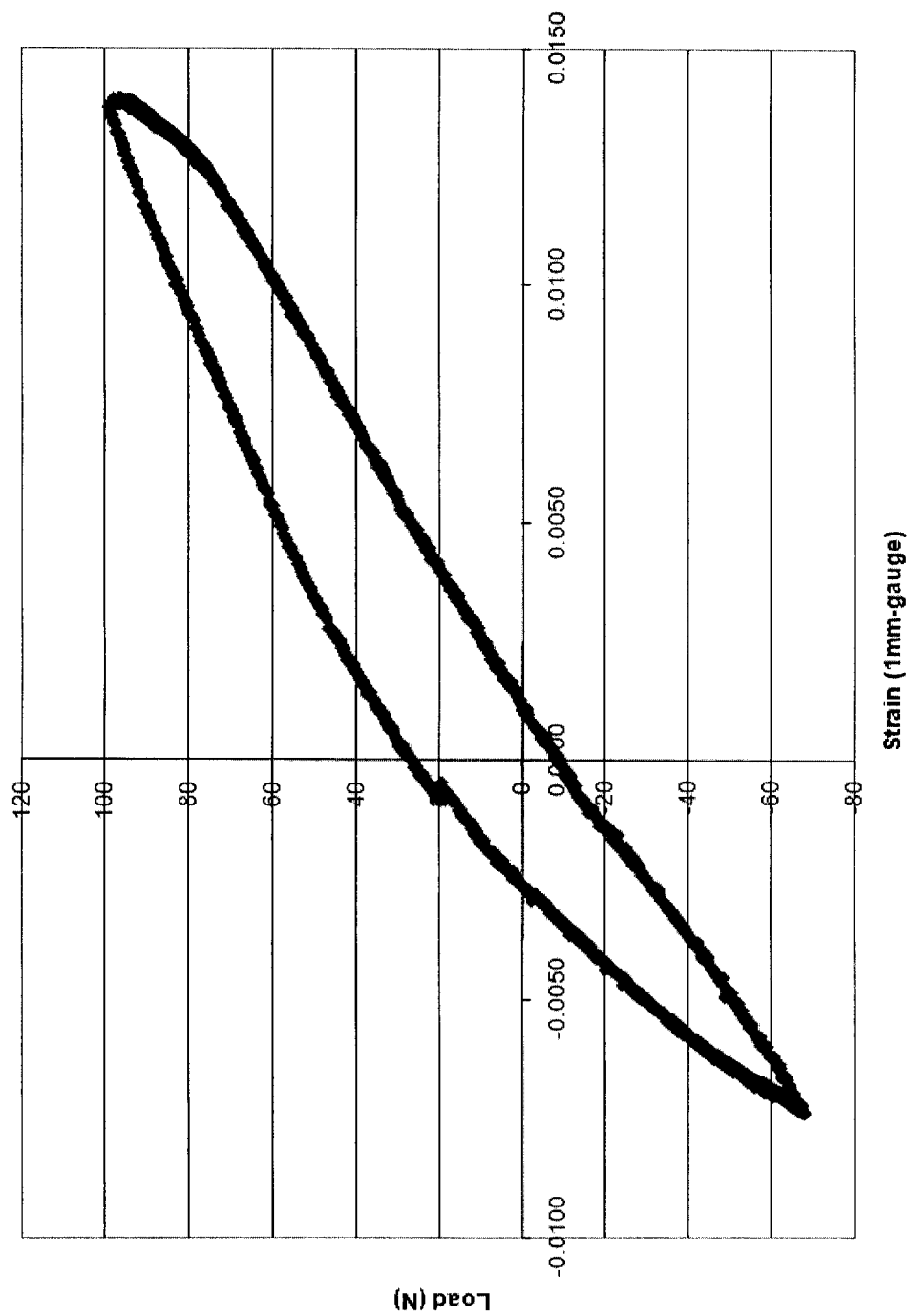
FIG. 6 is a graph illustrating cyclic tensile-compression data recorded using the tensile-compression mode of the mechanical test apparatus.

FIG. 6 shows actual cyclic tensile-compression test data obtained using the disclosed mechanical test fixture.

The invention claimed is:

1. An apparatus for measuring strain in a test specimen comprising:
   an upper bolt and a lower bolt for mounting said test specimen;
   a first ring for fastening said upper bolt to a mechanical test machine and constraining the movement of said upper bolt to the axial direction;
   a second ring for fastening said lower bolt to said mechanical test machine and constraining the movement of said lower bolt to the axial direction;
   a first collar with housings connected to said upper bolt;
   a second collar with housings connected to said lower bolt;
   a conductive target plate mounted in a said housing of said first collar in proximity to said test specimen such that the direction of the applied test load is perpendicular to the target surface of said conductive target plate; and
   a capacitive gauge sensor mounted in a said housing of said second collar in proximity to said test specimen such that the surface of said capacitive gauge sensor is vertically aligned with, and parallel to, said target surface of said conductive target plate forming a conductive target plate-capacitive gauge sensor pair,
      said conductive target plate-capacitive gauge sensor pair is positioned such that the distance between said target surface of said conductive target plate and said surface of said capacitive gauge sensor produces a signal that is within the measurement range of said capacitive gauge sensor, and
      upon commencement of a test, the amplitude of the voltage at said capacitive gauge sensor is proportional to the distance between said target surface of said conductive target plate and said surface of said capacitive gauge sensor and represents the dimensional change induced in said test specimen.

2. The apparatus of claim 1 in which multiple conductive target plate-capacitive gauge sensor pairs are located in said housings such that the fixture is balanced and a bending moment is not introduced.

3. The apparatus of claim 1 further comprising an adjusting mechanism in said first collar wherein the vertical position of said conductive target plate can be set by turning said adjusting mechanism to obtain the distance between said target surface of said conductive target plate and said surface of said capacitive gauge sensor such that a two plate electrode structure is formed by said conductive target plate-capacitive gauge sensor pair.

4. The apparatus of claim 3 further comprising:
   a first counter weight approximately equal to the weight of said conductive target plate mounted in said housing of said first collar; and
   a second counter weight approximately equal to the weight of said capacitive gauge sensor mounted in said housing of said second collar, aligned with, and parallel to said first counter weight, located in said housing such that the fixture is balanced and a bending moment is not introduced.

5. The apparatus of claim 4 in which said upper bolt and said lower bolt are configured for mounting tension, compression, and shear test specimens.

6. The apparatus of claim 4 in which said upper bolt and said lower bolt are configured for mounting bending test specimens.

7. The apparatus of claim 6 in which said upper bolt and said lower bolt are configured for mounting bending test specimens in which the bending span is adjustable.

8. An apparatus for measuring strain in a test specimen comprising:
   an upper bolt and a lower bolt for mounting said test specimen;
   a first ring for fastening said upper bolt to a mechanical test machine and constraining the movement of said upper bolt to the axial direction;
   a second ring for fastening said lower bolt to said mechanical test machine and constraining the movement of said lower bolt to the axial direction;
   a first collar with housings connected to said lower bolt;
   a second collar with housings connected to said upper bolt;
   a conductive target plate mounted in a said housing of said first collar in proximity to said test specimen such that the direction of the applied test load is perpendicular to the target surface of said conductive target plate; and
   a capacitive gauge sensor mounted in a said housing of said second collar in proximity to said test specimen such that the surface of said capacitive gauge sensor is vertically aligned with, and parallel to, said target surface of said conductive target plate forming a conductive target plate-capacitive gauge sensor pair,
      said conductive target plate-capacitive gauge sensor pair is positioned such that the distance between said target surface of said conductive target plate and said surface of said capacitive gauge sensor produces a signal that is within the measurement range of said capacitive gauge sensor, and
      upon commencement of a test, the amplitude of the voltage at said capacitive gauge sensor is proportional to the distance between said target surface of said conductive target plate and said surface of said capacitive gauge sensor and represents the dimensional change induced in said test specimen.

9. The apparatus of claim 8 in which multiple conductive target plate-capacitive gauge sensor pairs are located in said housings such that the fixture is balanced and a bending moment is not introduced.

10. The apparatus of claim 8 further comprising an adjusting mechanism in said first collar wherein the vertical position of said conductive target plate can be set by turning said adjusting mechanism to obtain the distance between said target surface of said conductive target plate and said surface of said capacitive gauge sensor such that a two plate electrode structure is formed by said conductive target plate-capacitive gauge sensor pair.

11. The apparatus of claim 10 further comprising:
a first counter weight approximately equal to the weight of said target conductive plate mounted in said housing of said first collar; and
a second counter weight approximately equal to the weight of said capacitive gauge sensor mounted in said housing of said second collar, aligned with, and parallel to said first counter weight, located in said housing such that the fixture is balanced and a bending moment is not introduced.

12. The apparatus of claim 11 in which said upper bolt and said lower bolt are configured for mounting tension, compression, and shear test specimens.

13. The apparatus of claim 11 in which said upper bolt and said lower bolt are configured for mounting bending test specimens.

14. The apparatus of claim 13 in which said upper bolt and said lower bolt are configured for mounting bending test specimens in which the bending span is adjustable.

15. An apparatus for measuring strain in a test specimen comprising:
an upper bolt and a lower bolt for mounting a test specimen;
a first ring for fastening said upper bolt to a mechanical test machine and constraining the movement of said upper bolt to the axial direction;
a second ring for fastening said lower bolt to said mechanical test machine and constraining the movement of said lower bolt to the axial direction;
a first collar with housings connected to said lower bolt;
a second collar with housings connected to said upper bolt;
a conductive target plate mounted in a said housing of either said first collar or said second collar in proximity to said test specimen such that the direction of the applied test load is perpendicular to the target surface of said conductive target plate; and
a capacitive gauge sensor mounted in a said housing of either said first collar or said second collar in proximity to said test specimen such that the surface of said capacitive gauge sensor is vertically aligned with, and parallel to, said target surface of said conductive target plate forming a conductive target plate-capacitive gauge sensor pair,
said conductive target plate-capacitive gauge sensor pair is positioned such that the distance between said target surface of said conductive target plate and said surface of said capacitive gauge sensors produces a signal that is within the measurement range of said capacitive gauge sensor, and
upon commencement of a test, the amplitude of the voltage at said capacitive gauge sensor is proportional to the distance between said target surface of said conductive target plate and said surface of said capacitive gauge sensor and represents the dimensional change induced in said test specimen.

16. The apparatus of claim 15 in which multiple conductive target plate-capacitive gauge sensor pairs are located in said housings such that the fixture is balanced and a bending moment is not introduced.

17. The apparatus of claim 15 further comprising an adjusting mechanism in said first collar wherein the vertical position of said conductive target plate and said capacitive gauge sensor can be set by turning said adjusting mechanism to obtain the distance between said target surface of said conductive target plate and said surface of said capacitive gauge sensor such that a two plate electrode structure is formed by said conductive target plate-capacitive gauge sensor pair.

18. The apparatus of claim 17 further comprising:
a first counter weight approximately equal to the weight of said conductive target plate mounted in said housing of said first collar or said second collar; and
a second counter weight approximately equal to the weight of said capacitive gauge sensor mounted in said housings of said first collar or said second collar, aligned with, and parallel to said first counter weight, located in said housing such that the fixture is balanced and a bending moment is not introduced.

19. The apparatus of claim 18 in which said upper bolt and said lower bolt are configured for mounting tension, compression, and shear test specimens.

20. The apparatus of claim 18 in which said upper bolt and said lower bolt are configured for mounting bending test specimens.

21. The apparatus of claim 20 in which said upper bolt and said lower bolt are configured for mounting bending test specimens in which the bending span is adjustable.

* * * * *